US009871662B2

(12) United States Patent
Glisson

(10) Patent No.: US 9,871,662 B2
(45) Date of Patent: Jan. 16, 2018

(54) SYSTEMS AND METHODS FOR DIGITAL CERTIFICATE AND ENCRYPTION KEY MANAGEMENT

(71) Applicant: NETFLIX, INC., Los Gatos, CA (US)

(72) Inventor: Kevin Glisson, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 181 days.

(21) Appl. No.: 14/865,698

(22) Filed: Sep. 25, 2015

(65) Prior Publication Data

US 2017/0093587 A1    Mar. 30, 2017

(51) Int. Cl.
*H04L 29/06*    (2006.01)
*H04L 9/32*    (2006.01)

(52) U.S. Cl.
CPC .......... *H04L 9/3268* (2013.01); *H04L 63/062* (2013.01)

(58) Field of Classification Search
CPC . G04L 63/0428; G04L 63/062; G04L 9/3268; H04L 63/0428; H04L 63/062; H04L 9/3268
See application file for complete search history.

(56) References Cited

U.S. PATENT DOCUMENTS

| | | | | |
|---|---|---|---|---|
| 6,118,874 A * | 9/2000 | Okamoto | .............. | H04L 9/0894 380/282 |
| 8,181,262 B2 * | 5/2012 | Cooper | ................... | H04K 1/00 709/223 |
| 2002/0147920 A1 * | 10/2002 | Mauro | ................. | G06Q 20/367 726/26 |
| 2003/0012386 A1 * | 1/2003 | Kim | ...................... | H04L 9/0894 380/286 |
| 2003/0126432 A1 * | 7/2003 | Tonisson | .......... | G11B 20/00086 713/156 |
| 2007/0079368 A1 * | 4/2007 | Takeyoshi | ........... | H04L 63/0209 726/15 |

(Continued)

OTHER PUBLICATIONS

Patrick Terlisten, "Replacing SSL certificates for vRealize Orchestrator Appliance", Retrieved From https://www.vcloudnine.de/replacing-ssl-certificates-for-vrealize-orchestrator-appliance/, Published Nov. 30, 2014.*

(Continued)

*Primary Examiner* — Chau Le
(74) *Attorney, Agent, or Firm* — Haynes and Boone, LLP; Theodore Foster

(57) ABSTRACT

A certificate orchestration system for digital certificate and encryption key management is provided herein along with associated methods. The system includes a certificate orchestration server having a processing device in communication with a coupled storage system that is coupled to the certificate orchestration server. The system further includes an interface provided by the certificate orchestration server to a client device; and a database to store digital certificates and keys. The certificate orchestration server is configured to receive a request from the client device to generate a digital certificate and an associated public key, receive the digital certificate and associated public key from a third-party certificate authority system over an external network, store the digital certificate and public key in the coupled storage system. The coupled storage system is not directly connected to the client device.

20 Claims, 6 Drawing Sheets

(56) References Cited

U.S. PATENT DOCUMENTS

| | | | | |
|---|---|---|---|---|
| 2007/0162554 | A1* | 7/2007 | Branda | H04L 12/581 709/207 |
| 2009/0232315 | A1* | 9/2009 | Bandaram | G06F 21/606 380/282 |
| 2010/0142713 | A1* | 6/2010 | Perlman | H04L 9/0894 380/286 |
| 2014/0093084 | A1* | 4/2014 | De Atley | H04L 9/0861 380/277 |
| 2014/0123167 | A1* | 5/2014 | Wood | H04N 7/17318 725/25 |
| 2015/0019443 | A1* | 1/2015 | Sheets | G06Q 20/3278 705/71 |
| 2015/0052358 | A1* | 2/2015 | Udupi | H04L 63/0435 713/171 |
| 2015/0341325 | A1* | 11/2015 | Al Jabri | H04L 63/0442 713/156 |
| 2017/0099292 | A1* | 4/2017 | Kelley | H04L 63/10 |

OTHER PUBLICATIONS

Spas Kaloferov, "Orchestrator Certificates Explained (SKKB1022)", Retrieved From http://kaloferov.com/blog/orchestrator-certificates-explained/, Published Dec. 18, 2015.*

* cited by examiner

SYSTEMS AND METHODS FOR DIGITAL CERTIFICATE AND ENCRYPTION KEY MANAGEMENT

TECHNICAL FIELD

The present disclosure relates generally to the generation and deployment of digital certificates and associated encryption keys in a network computing environment.

BACKGROUND

As the lives of ordinary consumers have become increasingly involved with network computing environments, such as the Internet, the need for secure communication has increased. For example, secure communication is needed to make purchases of items from an e-commerce website, to pay for services such as streaming video or streaming audio, to monitor a bank account and set up transfers, or to transmit and receive confidential information, such as account information or credit card numbers, the distribution of which could cause significant personal and/or financial harm.

Over the years developers have produced a number of secure communication schemes and techniques in order to facilitate interactions over the web or over the Internet more generally. One approach to secure communications involves cryptographic protocols like secure sockets layer (SSL) and transport layer security (TLS, although often referred to as SSL as well) that can provide for a public key infrastructure (PKI) which binds public keys with a certificate provided by a trusted certificate authority. A certificate authority is an entity that issues digital certificates and associated public keys, which can then be used to establish that a contacted service or associated server has been verified and can be trusted.

When a service requiring a level of trust is to be provided by servers associated with a domain, such as www.example-domain.com, a certificate can be issued that identifies www.exampledomain.com and includes a public encryption key that can be used in PKI-based authentication approaches along with a private encryption key. Because a user of the service trusts the certificate authority, the user may feel comfortable trusting a public encryption key associated with a digital certificate issued by that certificate authority. Corporations or other entities that provide information, products, services, etc., over the Internet may need many such certificates. Developers or network administrators employed by such an entity can request needed certificates from an issuing certificate authority.

However, current approaches to requesting and obtaining digital certificates can result in insecure handling and sharing of the digital certificates with their associated public keys. For example, private keys generated as part of the digital certificate creation process may be insecurely handled and shared in the process of trying to collaborate with other employees and to deploy the certificates to servers providing the domain or domains associated with the digital certificates. Accordingly, current approaches to the creation and management of digital certificates and associated encryption keys has not been entirely satisfactory.

SUMMARY

The present disclosure is directed to the secure management and generation of digital certificates and associated keys.

Exemplary management and generation systems are provided herein. An exemplary certificate orchestration system for digital certificate and encryption key management is provided herein along with associated methods. The system includes a certificate orchestration server having a processing device in communication with one or more coupled storage systems, at least one of which is coupled to the certificate orchestration server. The system further includes an interface provided by the certificate orchestration server to a client device; and a database to store digital certificates and keys. The certificate orchestration server is configured to receive a request from the client device to generate a digital certificate and an associated public key, receive the digital certificate and associated public key from a third-party certificate authority system over an external network, and store the digital certificate and public key in the coupled storage system. The coupled storage system is not directly connected to the client device.

Other embodiments of the present disclosure may include methods for managing and generating digital certificates and encryption keys is also provided herein. An exemplary method may include operations of receiving a request from a client device displaying a graphical user interface to generate a digital certificate and an associated public key and generating, by a processing device, a certificate signing request based on information received in the request from the client device. The method may further include operations of receiving, over an external network at a server comprising the processing device, the digital certificate and associated public key from a third-party certificate authority system; and storing the digital certificate, associated public key, and an associated private key in a storage device that is not directly connected to the client device.

Other embodiments of the present disclosure may include a non-transitory computer-readable storage medium containing executable code. When executed by a processing device, the code causes the processing device to perform operations including receiving a first request from a client device displaying a graphical user interface to generate a first digital certificate and a first public key and generating a first certificate signing request based on information received in the first request from the client device. The operations may further include receiving, over an external network at a server comprising the processing device, the first digital certificate and the first public key from a first third-party certificate authority system and storing the first digital certificate, the first public key, and an associated first private key in a storage system that is not directly connected to the client device.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the accompanying drawings and the following detailed description.

Figure 1:
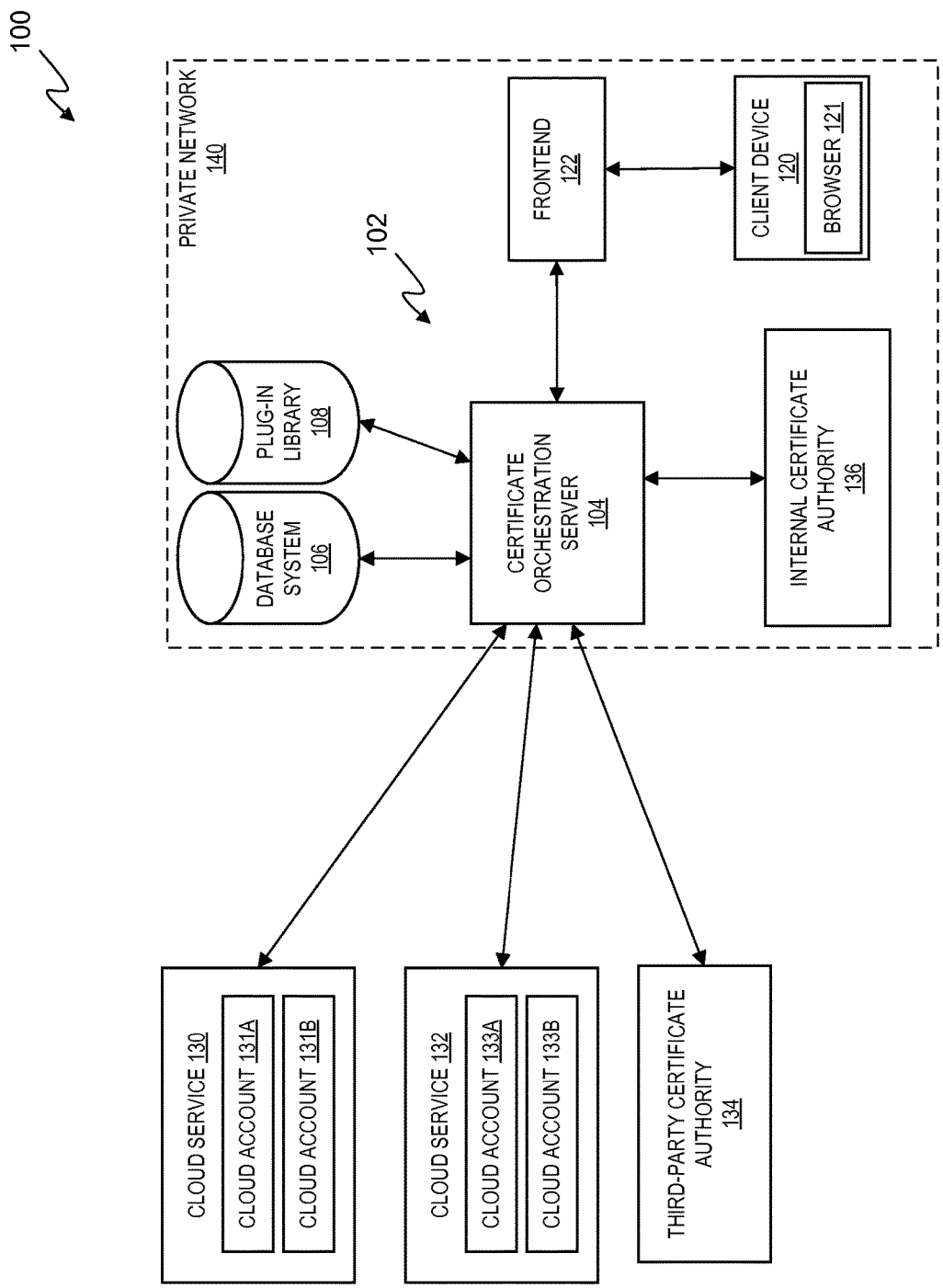
FIG. 1 is a block diagram of network environment including a certificate orchestration system that allows users to safely create and manage digital certificates, according to some embodiments of the present disclosure.

These drawings will be better understood by those of ordinary skill in the art by reference to the following detailed description.

DETAILED DESCRIPTION

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, well-known process steps have not been described in detail in order to avoid unnecessarily obscuring the present disclosure. Additionally, other applications of the concepts and principles described herein are possible, such that the following examples should not be taken as limiting. For example, while many of the examples disclosed herein are directed to digital certificates, the principles and concepts described may be applied to provide for the management and creation of other files that need to be securely handled.

In the following detailed description, references are made to the accompanying drawings, which form a part of the description and in which are shown, by way of illustration, some specific embodiments of the present disclosure. Although these embodiments are described in sufficient detail to enable one skilled in the art to practice the invention, it is understood that these embodiments are not limiting, such that other embodiments may be used, and changes may be made without departing from the spirit and scope of the invention. For example, changes within the scope of this disclosure may include performing an operation on another device in the certificate orchestration system, etc.

Devices, systems, and methods are provided for performing activities related to the generation and management of digital certificates and associate keys. In various particular embodiments, the devices, systems or methods involve one or more devices in communication over a network to provide users with the ability to request generation or creation of digital certificates and associated encryption keys and to identify and manage existing active and inactive digital certificates.

For example, in a conventional process of digital certificate creation, a developer working in an organization may use a client device, such as a laptop, a personal computer, etc. to communicate with a certificate authority that provides digital certificates for a fee or for free. Examples of certificate authorities include Symantec Corporation headquartered in Mountain View, Calif., Inc., GoDaddy of Scottsdale, Ariz., and others. Certificates issued by these or other trusted certificate authorities may be trusted by shoppers and other users of the Internet. The developer may navigate in a web browser to a website operated by a certificate authority and use an interface provided by the certificate authority to request a certificate and the associated public. Associated private keys may be generated by the developer's client device and stored thereon as part of the requesting process. Servers operated by the certificate authority as part of the certificate creation service provided by the certificate authority may generate the digital certificate and associated key or keys and provide them over the Internet to the client device of the developer. Developer may then deploy the digital certificate on a server or servers associated with the domain identified by the subject of the digital certificate. When an organization, such as a company needs many certificates to provide services to users of those services, the digital certificates and associated public and private keys may end up stored on the client devices of many different developers. In order to allow others within the company to use and access the digital certificates and keys, developers may communicate these files by way of communication channels like email or by copying onto a portable or network accessible memory device. In this way, information that is intended to be kept secret, such as a private encryption key may be copied and distributed to many different people within an organization, increasing the likelihood that an unauthorized actor could gain access to one or more private encryption keys of the company. The risks may increase significantly if the developer uses a personal email account to send the encryption keys and certificates.

Embodiments of the certificate orchestration system described herein provide a portal or interface whereby a developer may request a new digital certificate and associated keys without the digital certificate and keys ever being stored on a client device of the developer. For example, a developer may use a client device to access a certificate orchestration server, a server providing a certificate orchestration service, which has an exposed application program interface (API). The certificate orchestration server may communicate with the developer's client device to display a user interface of the certificate orchestration server to the developer. For example, the certificate orchestration server may provide a web-based interface, such as a JavaScript web application, accessible to the developer over a network, such as a private company network. The developer may interact with the user interface to provide information to the certificate orchestration server as part of a request for a digital certificate. The certificate orchestration server may receive that information and create a private encryption key and a certificate signing request (CSR) and transmit the CSR to a third-party certificate authority, e.g., Symantec, GoDaddy, etc., to request a digital certificate.

Because the certificate orchestration server communicates with the third-party certificate authority over an external network, such as the Internet, to request a digital certificate and an associated public encryption key, the third-party certificate authority provides the digital certificate and associated key or keys to the certificate orchestration server. The certificate orchestration server may receive the digital certificate and associated key on behalf of the requesting developer and store the received digital certificate and key in a database on a storage system coupled to the certificate orchestration server. The storage system may not be directly coupled to the client device that the developer used to request the digital certificate. For example, the storage system may be a storage device other than a hard drive or memory contained within or directly connected to the client device such as by a USB connection or other direct wired or wireless connection. In this manner, the digital certificate and the public and private encryption keys may deployable without ever being on the client device. Accordingly, the secret information may be more difficult for other to obtain by theft or loss of the developer's laptop, for example.

The certificate orchestration server may also deploy the digital certificate and associated keys to one or more connected servers, such as web servers. In some embodiments, the certificate orchestration server may communicate with a remote or "cloud" computing, distribution, and/or storage service such as Amazon Web Services, Inc. (AWS) of Amazon, Inc. of Seattle, Wash., Microsoft Azure of Microsoft, Inc. of Redmond, Wash., and others. In some embodiments, the certificate orchestration server may have access to one or more plug-ins that facilitate communications with APIs presented by one or more of the cloud services to allow the orchestration server to upload the digital certificate to appropriate cloud service accounts. The cloud service accounts may be identified from information provided by the user in requesting the digital certificate. For example, the user may enter one or more domain names associated with the digital certificate. The certificate orchestration server may have a list of domain names associated with each of the cloud services coupled to the certificate orchestration server. Using the list, the certificate orchestration server may determine to which cloud service(s) and cloud service account(s) the digital certificate needs to be uploaded for deployment.

While the certificate orchestration server may request and receive digital certificates on behalf of the client device (on behalf of the user interacting with the certificate orchestration server through the client device), a user of the certificate orchestration server may be able to access one or more digital certificates that the certificate orchestration server has stored in the associated database. In order for the user to access the services provided by the certificate orchestration server, the user may be required to authenticate to or log into the certificate orchestration server. For example, the user may use a graphical user interface provided via the client device to enter a username or other identifier of the user and a password or other secret information to be authenticated to the orchestration server. The orchestration server may limit the access of users to the digital certificates and associated public and private keys. For example, the orchestration server may require that the user be the creator or requester of a digital certificate in order to access that the digital certificate and private key. In some embodiments, the certificate orchestration server may use the identifier of the user to associate the user within owning group or owner of a digital certificate. For example, during creation the user may indicate a lead developer or a developer group that is associated with the digital certificate. Thereafter any user that is a member of the developer group or that reports to the lead developer may be provided with access to the digital certificate, including access to the associated private key, because of the user's association with the group or the lead developer. To facilitate determination of the members of a developer group, reporting structure, or similar inter-user relationship, the certificate orchestration server may communicate with a directory service, such as a Microsoft Active Directory server or a Lightweight Directory Access Protocol (LDAP) server.

Access to a certificate orchestration server operated by a company may be limited to devices within a private network of the company or connected to the private network of the company by a virtual private network (VPN). A user wishing to access the certificate orchestration server may be required to provide a username and password as well as an additional factor as part of a two-factor authentication regime. The certificate orchestration server may be accessed by a single-sign-on scheme such that the user may only need to authenticate to the company's private network in order to gain access to the certificate orchestration server to request new digital certificates or to access existing digital certificates.

In this manner, consistency and security associated with digital certificates may be increased. The user may request a digital certificate using the certificate orchestration server as an intermediary between a selected or default certificate authority. In some instances, the certificate orchestration server may also be in communication with an internal certificate authority that may be used to provide digital certificates and associated keys to servers internal to the company's private network. Because the digital certificates and associated keys are managed by the certificate orchestration server, the certificate orchestration server may be able to provide additional information and services such as accounts and other data about the company's active and inactive or expired digital certificates. In some embodiments, the certificate orchestration server may send an alert when a digital certificate is set to expire within a predetermined period of time.

Referring now to FIG. 1, shown therein is a block diagram of a networked environment 100 that includes a certificate orchestration system 102. The certificate orchestration system or certificate orchestration system 102 may be provided by one or more servers, such as the exemplary certificate orchestration server 104. The server 104 may include or be in communication with a memory having code stored thereon that, when executed, provides for an application program interface (API) that may be exposed to a client device 120. The orchestration system 102 may further include a database system 106 that has one or more storage devices or storage systems that may be used to store digital certificates and associated keys including private encryption keys. The certificates and keys may be stored in a relational database allowing the certificates and keys to be associated with additional information, such as usernames, group identifiers, and other information provided at the time of generation of the digital certificates by the requesting user of the orchestration system 102. The relational database or databases provided by the database system 106 may also permit a user to search the database system 106 for information contained within a digital certificate, such as a domain name or subject associated with the digital certificate, a name of the digital certificate, or an expiration date. Some embodiments of the database system 106 may include a database present on a hard drive of the certificate orchestration server 104.

The illustrated embodiment of the certificate orchestration system 102 also includes a plug-in library 108 that may include plug-ins or coded interfaces enabling the certificate orchestration server 104 to communicate with one or more third-party services or devices. For example, in performing operations in providing services described herein, the certificate orchestration system 102 may interact with third-party certificate authorities and third-party cloud services to obtain and deploy digital certificates and associated keys to permit users of services operated in connection with the certificate orchestration system 102 to securely access those services. For example, some embodiments of the certificate orchestration system 102 may be operated by Netflix, Inc. of Los Gatos, Calif. The plug-in library 108 may include a plug-in to facilitate communication between the certificate orchestration server 104 and a cloud service 130 providing cloud service accounts 131A and 131B. For example, in some embodiments the cloud service 130 is Amazon Web Services (AWS) provided by Amazon, Inc. The cloud service accounts 131A and 131B are AWS accounts, in such an embodiment. The networked environment 100 may also include a cloud service 132 providing cloud service accounts 133A and 133B. In some embodiments, the cloud service 132 may be the Google Cloud Platform provided by Google, Inc. of Mountain View, Calif. In such embodiments, the plug-in library 108 may include a plug-in corresponding to the Google Cloud Platform to facilitate the deployment of digital certificates stored in the database system 106 on the cloud service accounts 133A and/or 133B.

As described herein, a cloud service, like cloud services 130 and 132 may include many individual processing devices configured together in a data center environment providing computing and/or storing services to remote users. Accordingly, the cloud services 1301132 may include hundreds or thousands of networked servers and hundreds or thousands of storage devices. Each of the cloud services 130 and 132 may present an API to facilitate interaction with the certificate orchestration server 104. In some embodiments, the plug-ins in the plug-in library 108 may facilitate interaction of the certificate orchestration server 104 with the API presented by a particular cloud service.

The certificate orchestration server 104 may request digital certificates and associated public encryption keys from a third-party certificate authority 134. Some embodiments of the networked environment 100 may include more than one third-party certificate authority. As illustrated, the certificate orchestration system 102 may include or be in communication with an internal certificate authority 136. The internal certificate authority 136 may provide digital certificates intended for use within a private network, such as a private network 140 illustrated in FIG. 1 as including the orchestration system 102. In such embodiments, the certificate orchestration server 104 may request that the internal certificate authority 136 provide a digital certificate that can be used by an internal server. In other words, a first server in the private network system 102140 may provide a first application accessible to a second server within the private network 140. The first application may permit access to important confidential information, such as credit card information used for billing and payments. Internal digital certificates may be used to ensure that the second server is communicating with the first server when the second server attempts to access confidential information via the first application. For example, the second server may attempt to write confidential information to the first server. Writing the confidential information to a server other than the first server may result in the disclosure of confidential information either due to a malicious actor or due to error. The first and second servers may use certificates generated by the internal certificate authority 136.

To allow a user to operate the client device 120, which may be a laptop or desktop computer, a tablet, or other computing device, to interact with the certificate orchestration server 104, the certificate orchestration system 102 includes a frontend 122. The frontend 122 may be a web application such as a JavaScript web application that allows the client device 120 to exchange information with the certificate orchestration server 104 through a web browser running on the client device 120.

The certificate orchestration server 104 may be a computing device that comprises or implements one or more servers and/or software components that operate to perform various operations in accordance with the described embodiments. Exemplary servers may include, for example, stand-alone and enterprise-class servers operating a server operating system (OS) such as a MICROSOFT® OS, a UNIX® OS, a LINUX® OS, or another suitable server-based operating system. It should also be appreciated that the server 104 illustrated in FIG. 1 may be deployed in other ways and that the operations performed and/or the services provided by such server or servers may be combined or separated for a given implementation and may be performed by a greater number or fewer number of individual server devices. The one or more servers may be operated and/or maintained by the same or different entities. As illustrated, the certificate orchestration system 102, including the certificate orchestration server 104, may be operated by a service provider, also referred to herein as a system operator.

Data and/or voice communications between the client device 120, any other client devices configured to communication with the certificate orchestration server 104 within and over the private network 140, and the certificate orchestration server 104 may be sent over the private network 140, which may include one or more networks such as LAN, a WAN, a WWAN, a WLAN, a mobile telephone network, a landline telephone network, as well as other suitable networks. When the client device 120 is not connected directly within the private network 140, a virtual private network (VPN) may be used to provide controlled access to the client device 120 when properly authenticated through the VPN.

The client device 120 may be a computing device that comprises or employs one or more client devices, such as a personal computer, a laptop, a mobile-computing device, such as tablet computer or a smartphone, a wearable computing device, and/or any other computing device having computing and/or communications capabilities in accordance with the described embodiments. The client device 120 includes a processing device in communication with a data storage device or memory and is able to execute instructions corresponding to system programs and application programs to perform various computing and/or communications operations. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, application programming interfaces (APIs), and so forth. As shown in FIG. 1, the client device 120 executes software to provide a browser 121. The browser 121 may be a web browsing program such as Internet Explorer®, Chrome®, etc., and in turn, the browser 121 may interact with the frontend 122 to render a graphical user interface in a display coupled to the client device 120. In some embodiments, the frontend 122 may be a separate application executed on the client device 120 independently of the browser 121. In various embodiments, the display may be integrated with the housing of the client device 120 or may be physically separate therefrom and coupled thereto by a wired and/or a wireless communication link.

Figure 2:
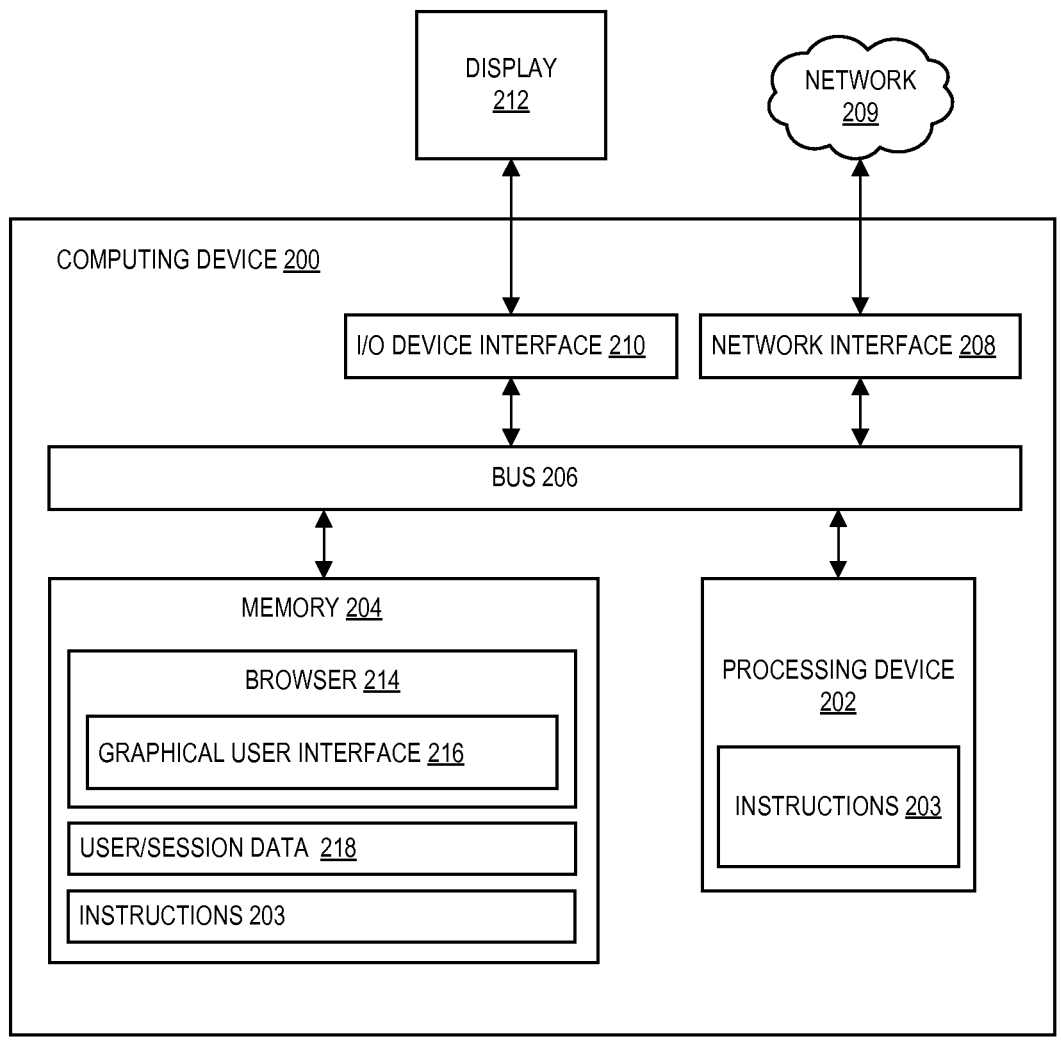
FIG. 2 is a block diagram of a computing device that may be used in certificate orchestration system of FIG. 1 according to some embodiments of the present disclosure.

Referring now to FIG. 2, shown therein is an exemplary embodiment of a computing device 200, embodiments of which may provide the client device 120 as described herein. The computing device 200 includes a processing device 202, such as one or more processors or CPUs, in communication with a data storage device or memory 204 over a bus 206. The bus 206 further couples a network interface device 208 and an I/O device interface 210. The network interface device 208 may be a network interface card or network interface controller (NIC) that permits the computing device 200 to communicate with the network 209, which may be the private network 140 of FIG. 1. The I/O device interface 210 enables the client to communicate information to be rendered to a display 212 to display information such as data and command options in graphical user interfaces associated therewith. The I/O device interface 210 may further communicate with I/O devices such as infra-red or radio-frequency remote controls, keyboards, mice, touchscreens, etc. The processing device 202 may execute software and/or other instructions 203 stored in the memory 204. The memory 204 may be a collection of memories of different types that are included in a housing of the client computing device or coupled to the computing device 200 and in communication therewith. For example, the memory 204 may include cache memory, RAM, ROM, a solid-state hard drive, a disk-based hard drive, and/or other memory devices. The features depicted as stored on the memory 204 may be stored on and/or accessed from any combination of these different types of memories.

As illustrated in FIG. 2, the memory 204 includes a browser 214, which may be a program executed by the processing device 202 to communicate with the frontend 122 of FIG. 1. The browser 214 may execute the frontend 122 of FIG. 1 to render a graphical user interface 216 in the display 212. The graphical user interface 216 may be the graphical user interface illustrated in FIGS. 4 and 5 as described in more detail below. The computing device 200 may receive information from a user of the computing device 200 through the I/O device interface 210. For example, the user may type on a keyboard to enter information into one or more fields provided in the graphical user interface 216.

The memory 204 may further include user/session data 218 that includes information exchanged between the computing device 200 and the certificate orchestration server 104 when creating and/or managing digital certificates as described herein. The user/session data 218 may also include authentication information exchanged with the certificate orchestration server 104 to authenticate the user of the computing device 200 to the certificate orchestration server 104.

Figure 3:
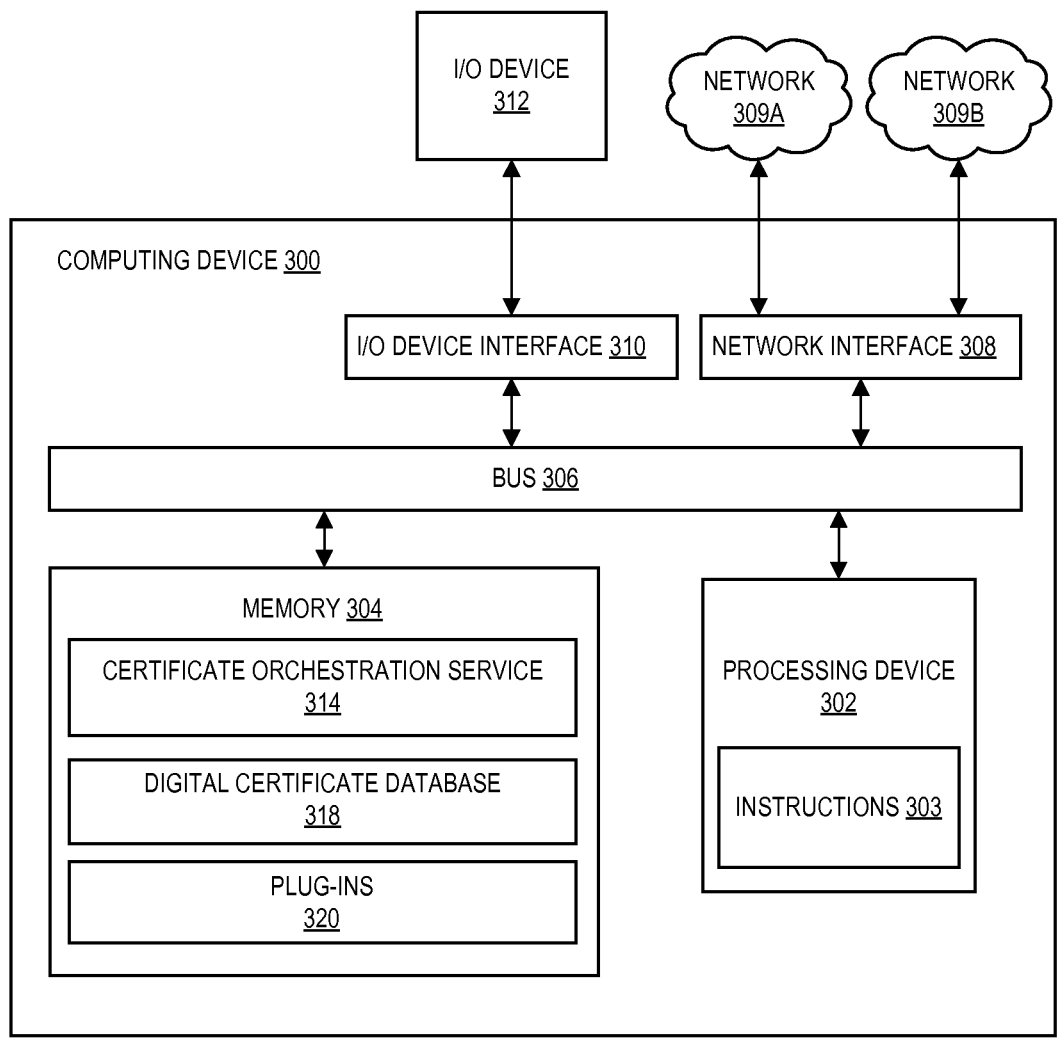
FIG. 3 is a block diagram of another computing device that may be used in certificate orchestration system of FIG. 1 according to some embodiments of the present disclosure.

Referring now to FIG. 3, shown therein is a computing device 300 which may provide the certificate orchestration server 104 of FIG. 1 as described herein. The computing device 300 is illustrated according to some embodiments of the present disclosure. The computing device 300 is similar in many respects to the computing device 200 of FIG. 2. As illustrated, the computing device 300 includes a processing device 302, such as a central processing unit (CPU), a microcontroller, or several such devices etc. The processing device 302 is in communication with a memory 304 over a bus 306. The bus 306 further connects the processing device 302 to a network interface 308 and an I/O device interface 310. As described above in connection with computing device 200 of FIG. 2, the network interface 308 may be a network interface card or a network interface controller (NIC) that enables the computing device 300 to communicate over a network with multiple devices, such as client devices and other servers and/or media storage devices. For example, the computing device 300 may communicate with the client device 120 over a first network 309A, which may be the private network 140 illustrated in FIG. 1. The computing device 300 may also communicate over network links to one or more cloud services or one or more certificate authorities, as illustrated in FIG. 1. The network links may be part of an external network 309B, such as the Internet. The I/O device interface 310 couples the computing device 300 to one or more I/O devices such as the I/O device 312. The I/O device 312 may be a display, a keyboard, a mouse, a touchscreen, etc. In some embodiments, the I/O device 312 may be in communication with the computing device 300 over the private network 140 such that the I/O device 312 is not directly connected to the computing device 300, but is connected to the computing device 300 through the network interface 308.

The processing device 302 retrieves and executes programming code or instructions 303. The instructions 303 may also be stored in data storage device or memory 304 and may further access data stored therein when executing programming instructions 303 to provide operations as described herein. While the memory 304 is illustrated as a single memory 304, the memory 304 may be a collection of memory types and devices. For example, the memory 304 may include cache memory, RAM, ROM, solid-state devices, magnetic disk-based storage devices, etc. In some embodiments, the memory 304 may further include networked-based storage, including a storage area network (SAN).

As illustrated, the memory 304 includes instructions for a certificate orchestration service 314, which may be executed by the processing device 302 as instructions 303. When executed by the processing device 302 to the certificate orchestration service 314 may perform the operations described herein in connection with the certificate orchestration system 102 of FIG. 1. Additionally, the memory 304 includes a digital certificate database 318, which may be similar to the database system 106 of FIG. 1. The digital certificate database 318 may include a plurality of digital certificates and associated keys along with additional information associated with and describing the digital certificates and associated keys. For example, the digital certificate database 318 may include information identifying a creator of a digital certificate or identifying a developer group associated with the digital certificate. For example, each digital certificates included in the digital certificate database 318 may include a subject identifying a domain name associated with the digital certificate. The digital certificate database 318 may associate that domain name with a group of developers in order to provide each member of the group of developers with access to the digital certificate.

As illustrated in FIG. 3, the memory 304 further includes plug-ins 320, which may facilitate communication between the computing device 300 and one or more cloud services or one or more certificate authorities with which the computing device 300 communicates over network 309B. For example, the computing device 300 may communicate with the cloud services 130 and 132 and the third-party certificate authority 134 included in the network environment 100 of FIG. 1.

Figure 4:
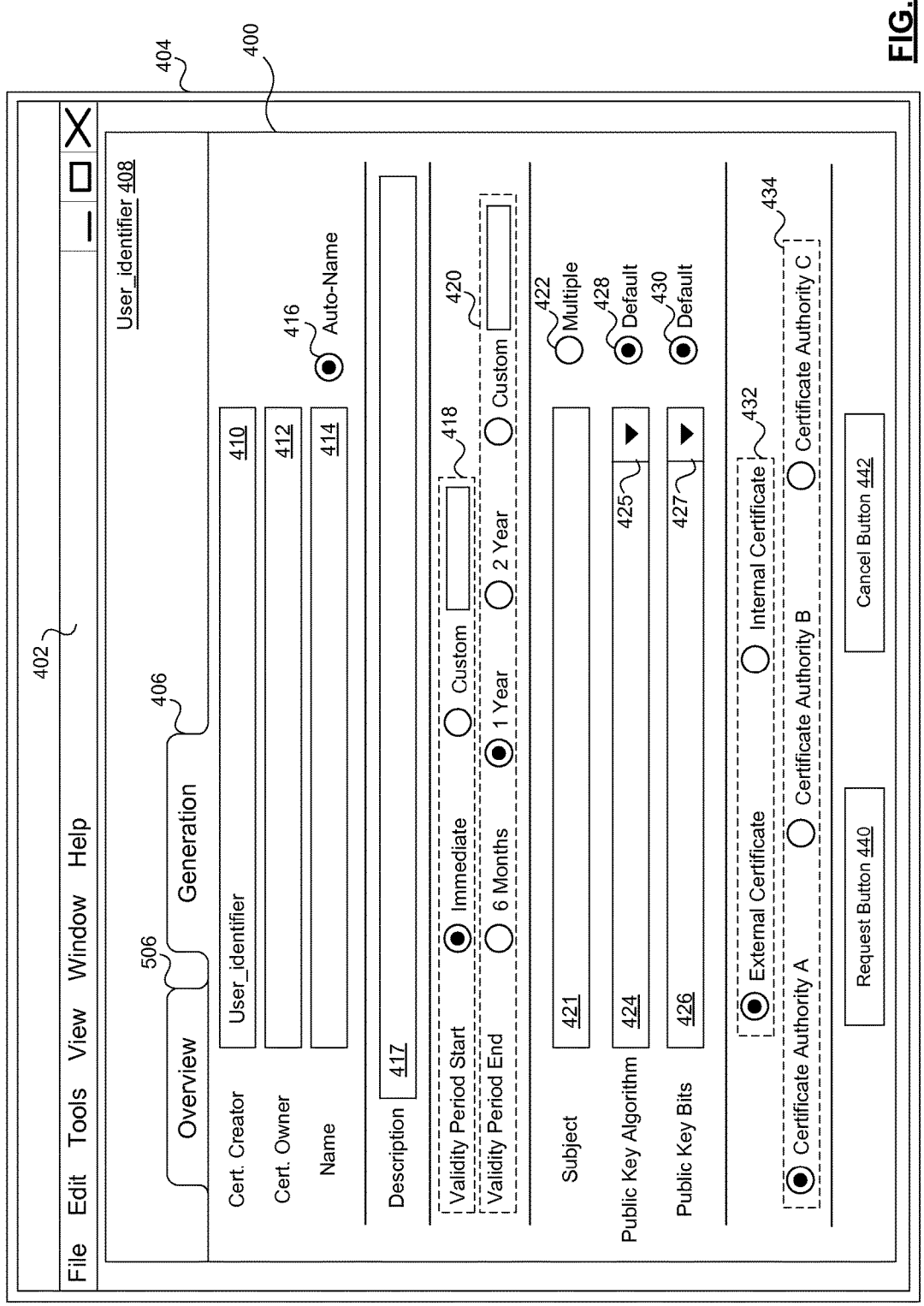
FIG. 4 is an illustration of an exemplary user interface for requesting generation of digital certificates, according to some embodiments of the present disclosure.

Referring now FIG. 4, shown therein is a graphical user interface 400 that may be provided by the certificate orchestration system 102 of FIG. 1 as part of the frontend 122. The frontend 122 may provide data that, when rendered by the client device 120, is presented to the user of the client device 120 as the graphical user interface 400. As illustrated, the graphical user interface 400 may be rendered in a window of a browser program like the browser 121 of FIG. 1 or browser 214 of FIG. 2. In some embodiments, the graphical user interface 400 may be provided by an application or application instructions executing on a client device, such as client device 120 or computing device 200 of FIGS. 1 and 2, respectively. In such cases, the application interacts with the frontend 122 to receive information from the certificate orchestration server 104 for presentation to the user of the client device and to provide commands and requests to the certificate orchestration server 104.

Graphical user interface 400 is illustrated in FIG. 4 is presented within a browser window 402 on a display 404.

Embodiments of the graphical user interface 400 include a plurality of user interface elements of various kinds to permit users to request creation or generation of digital certificates and associated keys and to permit users to manage existing digital certificates and keys. As illustrated, the graphical user interface 400 includes tabs that can be used to select between a certificate generation interface 406 and an overview interface 506 that is discussed in greater detail with respect to FIG. 5. The graphical user interface 400 also includes an account interface element 408. The account interface element 408 is depicted as a text feature identifying the user of the graphical user interface 400. For example, a user may be required to enter a username and a password in order to access features, functions, and operations provided by the graphical user interface 400. In some embodiments, the user may be required to provide an additional factor for authentication to the certificate orchestration system 102 before to being provided with the graphical user interface 400. For example, user may be required to enter a code sent to the user at an email account associated with user or as an SMS message sent to a phone number associated with user. In order to logout of the certificate orchestration system 102, the user may select the account interface element 408 which may then provide a submenu of items such as an account settings interface and a logout button.

When a user interacts with the certificate generation interface 406 to request generation of a digital certificate (including generation of an associated private key and public key), the user may select options and features with a mouse or other comparable I/O device. The user may also enter text using a keyboard or voice recognition software. A certificate creator field 410 may be pre-populated with an identifier of the user that is logged into the graphical user interface 400 to access the digital certificate orchestration system 102. In some embodiments the certificate creator field 410 may not provide the user with the ability to change the user identifier automatically included in the field.

The digital certificate generation interface 406 further includes a certificate owner field 412. The certificate owner field 412 may receive a text identifier of an owner of the certificate to be generated. The owner of the certificate may be an individual identified by an email address or other username associated with that individual. In some embodiments, the certificate orchestration system 102 may query a database containing information about employees of the operator of the certificate orchestration system 102. If the certificate orchestration system 102 identifies that the owner of the certificate is a lead developer or other employee having a supervisory role, the certificate orchestration system 102 may indicate in an associated database that members of a developer group led by the individual should be granted access to the digital certificate and associated keys once they are generated and stored by the certificate orchestration system 102. In other embodiments, the owner of the certificate may be a group identifier, e.g. an identifier of a group of developers would team of developers that work on the application or other project for which the digital certificates and keys are being generated.

The certificate generation interface 406 further includes a name field 414 in order to permit the user to provide a name for the certificate to be generated. The user may enter text into the name field 414 in order to name the certificate. As illustrated, the name field 414 is presented in the graphical user interface 400 with an auto-name interface 416. As illustrated, the auto-name interface 416 is a radio-button-type interface element. Other such elements may be used in different embodiments. When the user of the graphical user interface 400 selects the auto-name interface 416, the selection is treated by the certificate orchestration system 102 as a request to have the certificate orchestration system 102 provide the name of the certificate. In this way, a standardized naming convention may be applied by the certificate orchestration system 102 to all digital certificates created using the graphical user interface 400. For example, the certificate orchestration system 102 may have a default naming convention that includes the certificate owner, a domain name associated with the certificate, and a date of creation of the certificate. Other default naming conventions may be applied in other embodiments. When the auto name interface 416 is selected, the name field 414 may be automatically populated or filled by the name generated by the certificate orchestration system 102.

The certificate generation interface 406 includes a description field 417 in which the user may enter information regarding the digital certificate, such as internal project code names and descriptions, other applications that are related to the digital certificate, etc. The text description may be included in the database system 106 and stored in connection with the digital certificate after it has been generated.

The certificate generation interface 406 provides interface elements through which the user may request that the digital certificate have a specific a validity start date and a validity end date that defines a validity period of the digital certificate. The validity start date interface 418 may include interface elements allowing the user to select for immediate start, such that the created digital certificate will be effective immediately, or the user may select a custom start date. For example, the user may be requesting a digital certificate for an application that is not yet operational, but that will be operational in two weeks. The user may enter a custom start date to coincide with the launch of the application. A field may be included in the validity start date interface 418 to allow the user to enter the custom start date. Similarly, the certificate generation interface 406 includes a validity end date interface 420. After the end or expiration date of the digital certificate, the digital certificate may not be honored or trusted. The validity end date interface 420 may include a list of conventional options, such as one year or two year periods, i.e. one year or two year periods after the effective start date of the digital certificate. As illustrated, the validity end date interface 420 may further include a selectable six-month period and a custom date field in which a user may enter a custom end date for the digital certificate.

As illustrated in FIG. 4, the certificate generation interface 406 further includes a subject field 421 in which the user may enter the subject, e.g. a domain name, to be identified in the digital certificate. The user may be able to enter a specific domain, such as www.exampledomain.com, a wildcard domain, such as *.exampledomain.com, or multiple domains. To select multiple domains to be identified in the digital certificate, the user may need to select a multiple domain interface element 422. The selection of the multiple domain interface element 422 may cause additional subject fields, like the subject field 421, to appear in the certificate generation interface 406. The certificate generation interface 406 further includes a public key algorithm interface element 424 and a public key bits interface element 426. The interface elements 424 and 426 may be "drop-down" interface elements that present multiple options to the user from which the user may make a selection. For example, upon selecting the selector element 425, the user may be presented with a list containing multiple public key algorithms which may be used in generating the public encryption key associated with the digital certificate. The user may select any of the listed public key algorithms. Exemplary algorithms may include sha1WithRSAEncryption, sha256WithRSAEncryption, DSAwithSHA256, ECDSAwithSHA256, ECDSAwithSHA256, RSAroot, and others.

Similarly, upon selecting the selector element 427, the user may be presented with a list of bit lengths which can be used in generating the public key to indicate the bit length of the public key. The certificate generation interface 406 may provide default selections for both the public key algorithm and the public key bit length. A user may be able to select the default options by selecting the radio buttons 428 and/or 430, or other comparable interface elements. In some embodiments, the selection of the default options may cause a field associated with the interface elements 424 and 426 to be pre-populated with the default selections, e.g., SHA1 or RSA and 2048 bits, instead of 1024 or 512 bits. In this way, the certificate orchestration system 102 may ensure that a company preferred encryption algorithm is used and that the keys are sufficiently long. By using the radio buttons 428 and 430, the user may be able to create or request digital certificates without the involvement of a security team or security experts. For example, the certificate orchestration system 102 may provide a user interface whereby company policies may be established, in advance, that dictate the defaults used in the creation of digital certificates via the certificate orchestration system 102.

The certificate generation interface 406 further includes options whereby a user may specify the certificate authority that is to be used in generating the digital certificate. In other words, the user may select a certificate authority to which the certificate orchestration server is to send a certificate signing request. The certificate orchestration system 102 may provide for only a single certificate authority, in some embodiments. In such embodiments, the certificate generation interface 406 may not display certificate authority options to the user. As illustrated in FIG. 4, the certificate generation interface 406 includes an external/internal certificate interface element 432 that provides interface features to permit the user to select between an external certificate and an internal certificate. The user may be able to select one of the interface features.

When the user makes a selection using the external/internal certificate interface element 432, the user is requesting that the certificate orchestration system 102 make a request to a third-party certificate authority, like the third-party certificate authority 134 of FIG. 1. When the user selects the internal certificate interface feature within the external/internal certificate interface element 432, the user is requesting that the certificate orchestration system 102 request that the internal certificate authority 136 generate a new digital certificate. When the user selects the external certificate interface element 432, the user may be presented with a certificate authority selection interface 434, which may include identification of a plurality of certificate authorities from which the certificate orchestration system 102 may request a digital certificate on behalf of the user of the graphical user interface 400. As illustrated in FIG. 4, the certificate authority selection interface 434 includes radio buttons or other interface features associated with each of a certificate authority A, a certificate authority B, and a certificate authority C. The user may be able to select one of the certificate authorities identified in the certificate authority selection interface 434. In some embodiments, the plug-in library 108 of FIG. 1 may include a plug-in associated with each of the certificate authorities identified in the certificate authority selection interface 434. Some embodiments of the certificate generation interface 406 may not include the certificate authority selection interface 434. In such embodiments, the certificate orchestration system 102 may communicate with a single certificate authority to request digital certificates. The user may select a request button 440 to submit the request to the certificate orchestration system 102 or the user may select a cancel button 442 to cancel the request without sending it to the certificate orchestration system 102.

Figure 5:
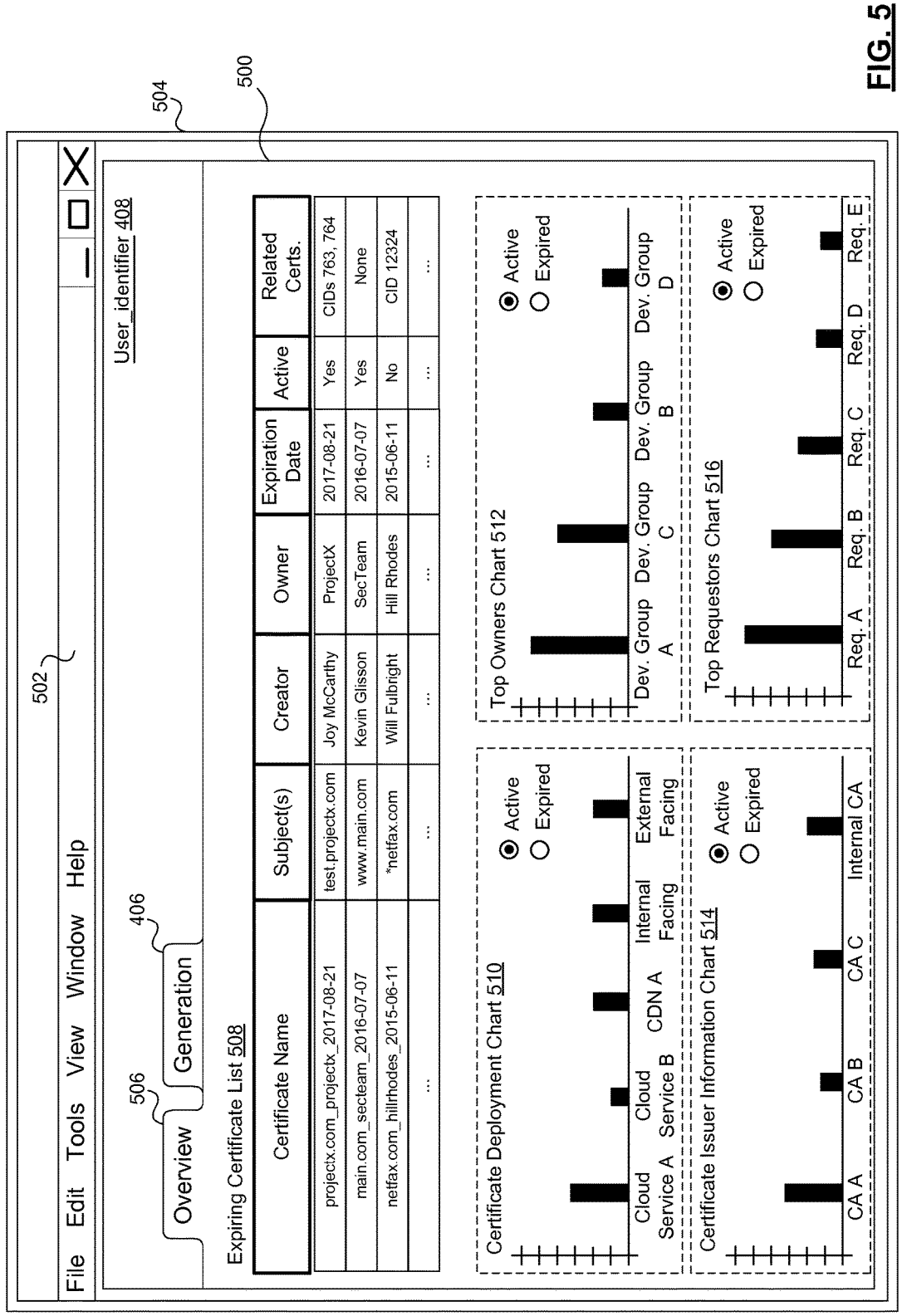
FIG. 5 is an illustration of an exemplary user interface for managing digital certificates, according to some embodiments of the present disclosure.

Referring now to FIG. 5, shown therein is a graphical user interface 500 that is similar in many respects to the graphical user interface 400 of FIG. 4. The user interface 500 is illustrated as being presented in a browser window 502 in a display 504. The graphical user interface 500 includes the account interface element 408, which is similar to the account interface element 408 of FIG. 4. The graphical user interface 500 includes tabs associated with the certificate generation interface 406, described herein with respect to FIG. 4, and the certificate overview interface 506. The certificate overview interface 506 provides the user with information regarding existing digital certificates and associated keys, including any recently issued digital certificates and keys. In some embodiments, the certificate overview interface 506 may include information regarding digital certificates that are presented by cloud services linked to the certificate orchestration system 102 of FIG. 1. For example, the certificate orchestration server 104 may query the cloud service 130 regarding cloud service accounts 131A and 131B which belong to the operator of the certificate orchestration system 102. The cloud service 130 may respond with all of the digital certificates used by servers operated by the cloud service operator on behalf of the operator of the certificate orchestration system 102. These digital certificates may be compared with existing digital certificates stored in the database system 106 of FIG. 1 to determine whether records of the digital certificates are already present therein. When a digital certificate is identified that has not been recorded by the certificate orchestration system 102, the certificate orchestration system 102 may retrieve the digital certificates and any associated stored keys and store this corresponding data in the database system 106. Thereafter, the digital certificates already deployed in the cloud service 130 may be maintained in the certificate orchestration system 102.

The certificate overview interface 506 includes a listing of digital certificates stored in the certificate orchestration system 102. In some embodiments, the listing of certificates may be presented in a particular order. For example, as illustrated, in the listing of digital certificates is an expiring certificate list 508 that lists existing certificates in order of their expiration. The expiring certificate list 508 may include every certificate associated with the operator of the certificate orchestration system 102, which may be hundreds or thousands of certificates. In some embodiments, already expired certificates may be omitted from the expiring certificate list 508. The expiring certificate list 508 may display digital certificates in a row and column format or in icons that can be selected or rested upon by a cursor to provide a pop-up interface element having additional information. As illustrated in FIG. 5, each row of the expiring certificate list 508 includes fields for a name of the certificate, a subject or domain of the certificate, an identifier of the creator requester of the certificate, an identifier of an owner or group owner of the certificate, an expiration date, an indicator of whether the certificate is still in active use, and any related certificates identified by the certificate orchestration system 102. In some embodiments, each certificate having a record in the database is assigned a certificate identifier (CID), a numeric or alphanumeric identifier, that is unique within the database server 106.

The certificate orchestration system 102 may identify two certificates, having records in the database system 106, that present a number of similarities or more than a threshold number or degree of similarity. For example, the certificate names may be substantially identical (with the exception of a date when a date is included in the certificate names), the subjects may be the same, with the same creators and owners, the domain names may be the same or related, and/or the descriptions associated with the certificates may be the same. The certificate orchestration system 102 may identify the certificates as related. In some embodiments, when related certificates identified, the certificate orchestration system 102 may send a communication to the creator, the owner, or a certificate orchestration service administrator inquiring whether the certificates are related or are duplicates, etc.

Additionally, the certificate orchestration system 102 may identify any certificates that expire within a given amount of time (e.g. two months, one month, a week), and send an alert to parties identified as being associated with the certificates in the information contained in the database system 106. For example, the certificate orchestration system 102 may send an email to the creator of the certificate, an owner or owner group associated with the certificate and/or an administrator of the certificate orchestration system 102. The certificate orchestration system 102 may provide alerts in other ways, such as by a notification in the graphical user interface 500 or the graphical user interface 400, by a text message, or other notification means.

As noted, the expiring certificate list 508 may include an indication of whether the listed certificate is in active use or not. The certificate orchestration system 102 may communicate with the cloud services 130 and 132 of FIG. 1 to request a list of active domains. By comparing this list of active domains, or another list of active domains associated with an operator of the certificate orchestration system 102, with the domains listed in the subject fields of digital certificates stored in the database system 106, the digital certificate orchestration system 102 may flag any unmatched domains as inactive or unused.

The certificate overview interface 506 may further include charts, graphs, or diagrams that provide information about active and inactive certificates stored in the database system 106. For example, the certificate overview interface 506 may include a certificate deployment chart 510 that indicates where the certificates and associated keys are deployed. For example, they certificate deployment chart 510 of FIG. 5 indicates digital certificates deployed by a cloud service A, a cloud service B, a content distribution network (CDN) A (which may be understood as a particular type of cloud server), and digital certificates deployed internally. The certificate overview interface 506 may further include a top owners chart 512, a certificate issuer information chart 514, and/or a top requesters chart 516. The top owners chart 512 may indicate which developers or developer groups within an organization that operates the certificate orchestration system 102 employ the most digital certificates. Because most digital certificates are purchased from a third-party certificate authority that charges a per certificate fee, identifying developers or developer groups that use many digital certificates may facilitate cost control on the part of the operator of the certificate orchestration system 102. Accordingly, the top owners chart 512 lists four developer groups (developer group A, developer group B, developer group C, and developer group D) in a rank order according to the number or percent of digital certificates associated with that group.

The certificate issuer information chart 514 included in the illustrated embodiment of the certificate overview interface 506 provides information about the certificate authorities being used by the certificate orchestration system 102 to generate digital certificates and associated keys. The top requesters chart 516 displays graphical information regarding the requesters or creators of the digital certificates included in the database system 106. Not all of the digital certificates included in the database system 106 may include such information, as some of the digital certificates may have been obtained outside of the certificate orchestration system 102. These charts and other charts included in the certificate overview interface 506 may include interface elements that permit the user to toggle between active certificates, expired certificates, or both when displaying information to the user. This information may facilitate the management of existing certificates and may facilitate in decisions regarding requests for additional certificates. Embodiments of the certificate overview interface 506 may include additional displays or alternative displays that facilitate management and information discovery regarding digital certificates deployed by an operator.

Figure 6:
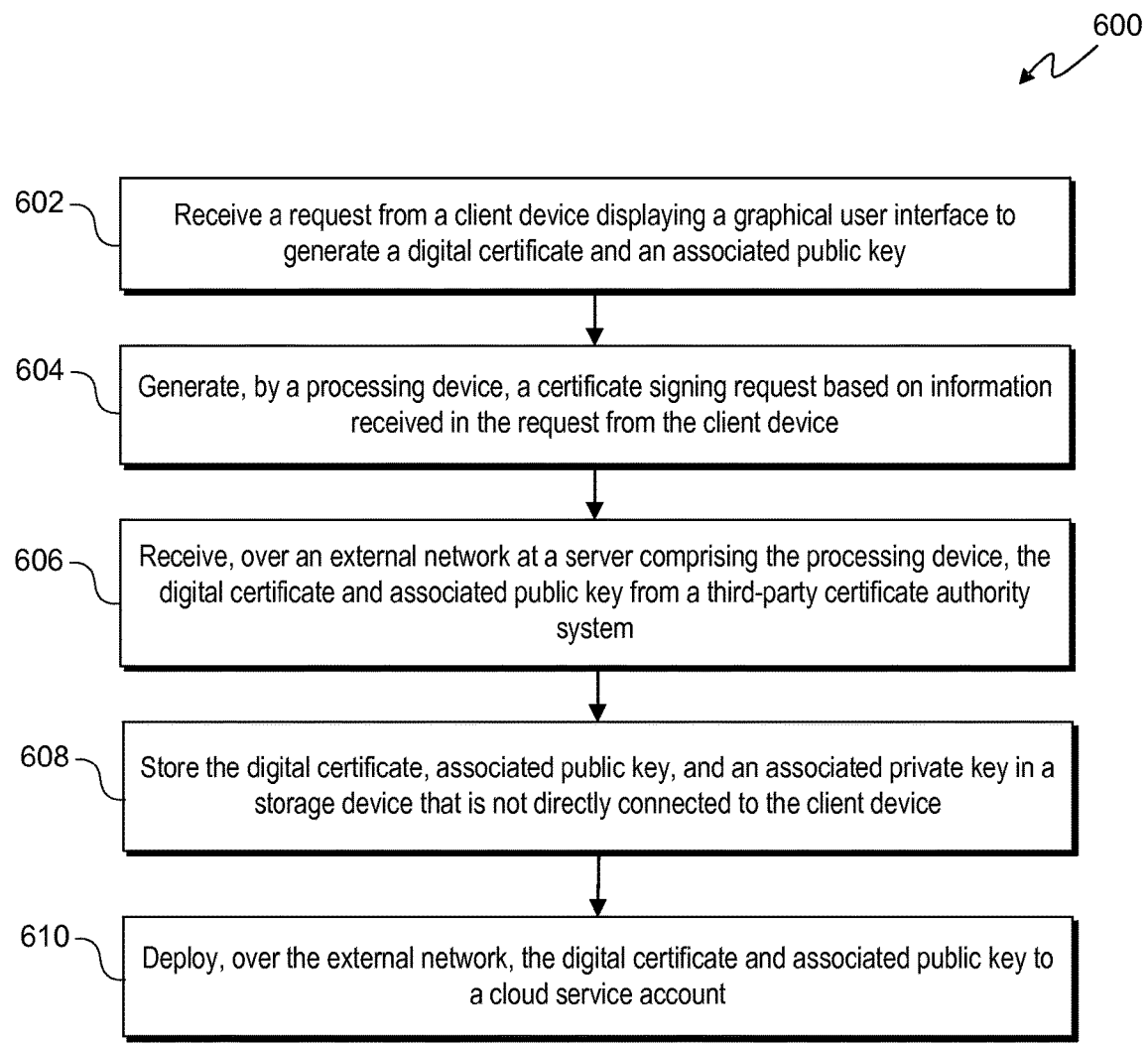
FIG. 6 is a flowchart illustrating a method of securely generating digital certificates and associated keys, according to some embodiments of the present disclosure.

Referring now to FIG. 6, shown therein is flowchart of a method 600 for generating digital certificates and associated keys. As illustrated, method 600 includes several enumerated steps or operations. Embodiments of the method 600 may include additional steps or operations before, after, in between, or as part of the enumerated operations. Some embodiments of the present disclosure include instructions like the instructions 303 of FIG. 3 stored on a non-transitory computer-readable storage medium, like the memory 304 of FIG. 3. When executed, the instructions may cause a processing device, like the processing device 302 of computing device 300 also shown in FIG. 3.

Embodiments of the method 600 may begin at step 602 at which a request is received from a client device displaying a graphical user interface to generate a digital certificate. In some embodiments, the request may include a request to generate associated keys including a public encryption key and/or a private encryption key. For example, the certificate orchestration server 104 may receive a request from the client device 120 through the frontend 122 shown in FIG. 1 and described herein. The client device 120 and the frontend 122 may cooperate to display the graphical user interfaces 400 and/or 500 of FIGS. 4 and 5 respectively, in a display of the client device 120. The user of the client device 120 may enter information into fields and using interface elements of the graphical user interfaces and submit a request. The request may be received over a network, such as over private network 140, by the certificate orchestration server 104.

At step 604, a certificate signing request (CSR) is generated based on information received in the request from the client device. For example, the certificate orchestration system 102 may extract information from the request received from the client device 120, and format the information according to requirements of a third-party certificate authority system or service identified in the request. For example, the user may interact with the graphical user interface 400 to request that the certificate authority 134 of FIG. 1 be used to generate the digital certificate. In some embodiments, the certificate orchestration system 102 may interact with an API exposed by the third-party certificate authority 134 to request that the third-party certificate authority 134 generate a digital certificate according to the request the certificate orchestration system 102 received from the user of the client device 120. In some embodiments, the certificate orchestration server 104 may identify a plug-in in the plug-in library 108 to use in communicating with the third-party certificate authority 134.

At step 606, the certificate orchestration service may receive the digital certificate and the associated public key from the third-party certificate authority. For example, the certificate orchestration server 104 may receive the certificate and key over a network connection with the certificate authority 134. The network connection may be present over an external network, such as the Internet. At step 608, the digital certificate and associated keys (public and private keys) may be stored in a storage device that is not directly connected to the client device. For example, the certificate orchestration server 104 may receive the certificate and public key and store the certificate and keys in the database system 106, in a database provided on one or more storage devices thereof. The database system 106 may be accessible to the client device 120 only after authentication to the certificate orchestration server 104, as such the database system 106 is not directly coupled to the client device. For example, an internal memory device, a USB flash drive connected to the client device 120 may be considered as being "directly coupled" to the client device 120. Similarly, a wireless connection directly between a storage device and the client device 120 may be considered as "directly coupling" the devices together. The digital certificate and associated keys are stored in a relational database that permits the searching and cataloging of information associated with the certificate and keys. Some of the information stored in connection with a digital certificate may include information obtained from the digital certificate itself. Additional information may be obtained from the request generated by the client device 120 through the user's interactions with the graphical user interface 400 or 500.

At step 610, the digital certificate and associate public key may be deployed to a cloud service or to a cloud service account associated with the operator of the certificate orchestration service. For example, after storing the digital certificate and keys in the database system 106, the certificate orchestration server 104 may retrieve them from the database system 106 or from local memory and upload them to the cloud service 130 or cloud service 132 by interacting with an API exposed by the cloud services. In communicating with the cloud service to request that the cloud service 130 or 132 deploy the certificate on servers identified by the subject of the certificate. This may entail identification of a cloud service account, such as an AWS account, associated with the domain or domains identified by the subject of the digital certificate. In communicating with the cloud service 130 and/or the cloud service 132, the certificate orchestration server 104 may utilize a corresponding plug-in available in the plug-in library 128.

In order to deploy the digital certificate, the certificate orchestration system 102 may determine which cloud service needs to deploy the digital certificate and then interact with that cloud service to see that the digital certificate is deployed. Then certificate orchestration system 102 may search the database of digital certificate information in the database system 106 to identify which cloud service or content distribution network is associated with the domain or domains identified in the digital certificate to identify the appropriate cloud service for deployment of the digital certificate.

Some embodiments of the method 600 may include presenting a listing of digital certificates stored in the database system 106 to a user through the graphical user interface 500 displayed on the client device 120. The method may include receiving an identifier of the user of the client device, and determining a subset of the digital certificates that the user has permission to view or to copy and presenting only the subset of digital certificates in the listing. In some embodiments, before a user can send a request to the certificate orchestration system 102, the certificate orchestration system 102 may check a database having employment information, such as an identification of any teams with which the user is associated. The user may be prevented from listing any certificates associated with an owner to which the user does not report or does not belong. Yet other embodiments of the method 600 may include determining a subset of digital certificates, included in the database system 106, that have expiration dates within a predetermined time period. The certificate orchestration system 102 may generate and communicate alerts to the associated creator/requestor of the certificate, an owner of the certificate or owner of the domain identified in the subject of the certificate, and/or to an administration of the certificate orchestration system 102. Embodiments of the method 600 may include additional operations to provide the features and functions discussed herein with respect to the graphical user interfaces 400 and 500 of FIGS. 4 and 5.

Embodiments of the presently disclosed systems, interfaces, and methods may provide for more secure generation of digital certificates. Employees within an organization may request certificates, but those certificates may be prevented from being stored on a client device of the requesting employee. The certificate orchestration service may process the request from the user and generate a corresponding request to communicate to a certificate authority. The certificate authority returns the requested digital certificates and public keys to the certificate orchestration service, rather than to a client device used by the employee to request the certificate. The certificate orchestration service may generate an associated private key and store the digital certificate, public key, and private key in a storage device or storage system that is not directly coupled to the client device of the employee.

Certain aspects of the present disclosure are set out the new following numbered clauses:

1. A certificate orchestration system for digital certificate and encryption key management, the system comprising: a certificate orchestration server having a processing device in communication with one or more coupled storage systems, the one or more coupled storage systems being coupled to the certificate orchestration server, an interface provided by the certificate orchestration server to a client device; and a database, included in the one or more coupled storage systems, to store digital certificates and keys, and wherein the certificate orchestration server is configured to: receive a request from the client device to generate a digital certificate and an associated public key; receive, over an external network, the digital certificate and associated public key from a third-party certificate authority system; and store the digital certificate and associated public key in one of the one or more coupled storage systems, which is not directly connected to the client device.

2. The system of clause 1, further comprising a plug-in library accessible to the certificate orchestration server, the plug-in library including one or more plug-ins that enable the certificate orchestration server to deploy the digital certificate on a third-party cloud service.

3. The system of any of clauses 1-2, wherein the certificate orchestration server is further configured to deploy, over the external network, the digital certificate and the associated public key to a cloud service account.

4. The system of any of clauses 1-3, further comprising a certificate authority server that generates digital certificates in response to receipt of a certificate signing request.

5. The system of any of clauses 1-4, wherein the interface is a JavaScript web application.

6. The system of any of clauses 1-5, wherein the interface permits a user of the client device to access the stored digital certificate after the user is authenticated to the certificate orchestration server.

7. A non-transitory computer-readable storage medium storing instructions that, when executed by one or more processing devices, cause the processing devices to perform any of the features recited in any of clauses 1-7.

8. A computer program product including instructions that, when implemented on one or more processing devices, carries out any of the features recited in any of clauses 1-7.

9. A method that, when implemented by one or more processing devices, performs operations providing any of the features recited in any of clauses 1-7.

10. A method comprising: receiving a request from a client device displaying a graphical user interface to generate a digital certificate and an associated public key; generating, by a processing device, a certificate signing request based on information received in the request from the client device; receiving, over an external network at a server comprising the processing device, the digital certificate and associated public key from a third-party certificate authority system; and storing the digital certificate, associated public key, and an associated private key in a storage device that is not directly connected to the client device.

11. The method of clause 10, further comprising deploying, over the external network, the digital certificate and associated public key to a cloud service account.

12. The method of any of clauses 10-11, wherein the deploying comprises: determining a cloud service associated with a domain indicated in the digital certificate; transmitting the digital certificate to the cloud service for deployment to cloud service servers associated with the domain indicated in the digital certificate.

13. The method of any of clauses 10-12, further comprising deploying the digital certificate and associated public key to an additional cloud service account.

14. The method of any of clauses 10-13, wherein receiving the request from the client device displaying the graphical user interface comprises receiving: an identifier identifying a user of the client device to a certificate orchestration server including the processing device; a digital certificate owner identifier; a text description of the digital certificate; and a domain name.

15. The method of any of clauses 10-14, wherein the graphic user interface comprises: a public key algorithm selection field including a default public key algorithm selection option; a public key bits selection field including a default public key bits selection option; and a certificate authority selection field permitting a user to select one certificate authority from among a plurality of certificate authorities from which the digital certificate is to be requested.

16. The method of any of clauses 10-15, wherein storing the digital certificate, the associated public key, and the associate private key comprises storing the digital certificate, the associated public key, and the associate private key in a database that further includes: an identifier of a user of the client device that caused the client device to request generation of the digital certificate, an identifier of a developer group associated with the digital certificate, and a text description of the digital certificate.

17. The method of any of clauses 10-16, further comprising: receiving an identifier of a user of the client device requesting generation of the digital certificate and an identifier of a developer group to be associated with the digital certificate; and verifying that the user is a member of the developer group before generating the certificate signing request.

18. The method of any of clauses 10-17, further comprising sending an alert to a subset of users of a certificate orchestration server associated with the stored digital certificate, the alert being sent at a predetermined time before the digital certificate is to expire to alert the subset of users to an impending expiration of the digital certificate.

19. The method of any of clauses 10-18, further comprising: communicating with a cloud service to identify a digital certificate associated with a cloud service account; determining whether the identified digital certificate is present in the storage device; and storing a copy of the identified digital certificate in the storage device when the identified digital certificate is not present in the storage device.

20. A non-transitory computer-readable storage medium storing instructions that, when executed by one or more processing devices, cause the processing devices to perform any of the features recited in any of clauses 10-19.

21. A computer program product including instructions that, when implemented on one or more processing devices, carries out any of the features recited in any of clauses 10-19.

22. A computing system that, when implemented by one or more processing devices, performs operations providing any of the features recited in any of clauses 10-19.

23. A non-transitory computer-readable storage medium containing executable code that when executed by a processing device, causes the processing device to perform operations comprising: receiving a first request from a client device displaying a graphical user interface to generate a first digital certificate and a first public key; generating a first certificate signing request based on information received in the first request from the client device; receiving, over an external network at a server comprising the processing device, the first digital certificate and the first public key from a first third-party certificate authority system; and storing the first digital certificate, the first public key, and an associated first private key in a storage system that is not directly connected to the client device.

24. The computer-readable storage medium of clause 23, wherein the operations further comprise storing, in the storage system, an identifier of a user of the client device that caused the client device to request generation of the stored first digital certificate, an identifier of a developer group associated with the stored first digital certificate, and a text description of the stored first digital certificate.

25. The computer-readable storage medium of any of clauses 23-24, wherein the operations further comprise deploying, over the external network, the first digital certificate and first public key to a first cloud service account.

26. The computer-readable storage medium of any of clauses 23-25, wherein the operations further comprise: receiving a second request from the client device displaying the graphical user interface to generate a second digital certificate; generating, by a processing device, a second certificate signing request based on information received in the second request from the client device; receiving, over an external network at a server comprising the processing device, the second digital certificate from a second third-party certificate authority system; and storing the second digital certificate in the storage system.

27. A computer program product including instructions that, when implemented on one or more processing devices, carries out any of the features recited in any of clauses 23-26.

28. A computing system that, when implemented by one or more processing devices, performs operations providing any of the features recited in any of clauses 23-26.

29. A method that, when implemented by one or more processing devices, performs operations providing any of the features recited in any of clauses 23-26.

Although the foregoing aspects of the present disclosure have been described in detail by way of illustration and example for purposes of clarity and understanding, it will be recognized that the above-described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A certificate orchestration system for digital certificate and encryption key management, the system comprising:
   a certificate orchestration server having a processing device in communication with one or more coupled storage systems, the one or more coupled storage systems being coupled to the certificate orchestration server,
   an interface provided by the certificate orchestration server to a client device; and
   a database, included in the one or more coupled storage systems, to store digital certificates and keys, and
   wherein the certificate orchestration server is configured to:
      receive a request from the client device to generate a digital certificate and an associated public key;
      receive, over an external network, the digital certificate and associated public key from a third-party certificate authority system; and
      store the digital certificate and associated public key in one of the one or more coupled storage systems, which is not directly connected to the client device.

2. The system of claim 1, further comprising a plug-in library accessible to the certificate orchestration server, the plug-in library including one or more plug-ins that enable the certificate orchestration server to deploy the digital certificate on a third-party cloud service.

3. The system of claim 1, wherein the certificate orchestration server is further configured to deploy, over the external network, the digital certificate and the associated public key to a cloud service account.

4. The system of claim 1, further comprising a certificate authority server that generates digital certificates in response to receipt of a certificate signing request.

5. The system of claim 1, wherein the interface is a JavaScript web application.

6. The system of claim 1, wherein the interface permits a user of the client device to access the stored digital certificate after the user is authenticated to the certificate orchestration server.

7. A method comprising:
   receiving a request from a client device displaying a graphical user interface to generate a digital certificate and an associated public key, wherein the graphic user interface comprises a public key algorithm selection field including a default public key algorithm selection option;
   generating, by a processing device, a certificate signing request based on information received in the request from the client device;
   receiving, over an external network at a server comprising the processing device, the digital certificate and associated public key from a third-party certificate authority system; and
   storing the digital certificate, associated public key, and an associated private key in a storage device that is not directly connected to the client device.

8. The method of claim 7, further comprising deploying, over the external network, the digital certificate and associated public key to a cloud service account.

9. The method of claim 8, wherein the deploying comprises:
   determining a cloud service associated with a domain indicated in the digital certificate; and
   transmitting the digital certificate to the cloud service for deployment to cloud service servers associated with the domain indicated in the digital certificate.

10. The method of claim 8, further comprising deploying the digital certificate and associated public key to an additional cloud service account.

11. The method of claim 7, wherein receiving the request from the client device displaying the graphical user interface comprises receiving:
   an identifier identifying a user of the client device to a certificate orchestration server including the processing device;
   a digital certificate owner identifier;
   a text description of the digital certificate; and
   a domain name.

12. The method of claim 7, wherein the graphic user interface further comprises:
   a public key bits selection field including a default public key bits selection option; and
   a certificate authority selection field permitting a user to select one certificate authority from among a plurality of certificate authorities from which the digital certificate is to be requested.

13. The method of claim 7, wherein storing the digital certificate, the associated public key, and the associate private key comprises storing the digital certificate, the associated public key, and the associate private key in a database that further includes:
   an identifier of a user of the client device that caused the client device to request generation of the digital certificate,
   an identifier of a developer group associated with the digital certificate, and
   a text description of the digital certificate.

14. The method of claim 7, further comprising:
   receiving an identifier of a user of the client device requesting generation of the digital certificate and an identifier of a developer group to be associated with the digital certificate; and
   verifying that the user is a member of the developer group before generating the certificate signing request.

15. The method of claim 7, further comprising sending an alert to a subset of users of a certificate orchestration server associated with the stored digital certificate, the alert being sent at a predetermined time before the digital certificate is to expire to alert the subset of users to an impending expiration of the digital certificate.

16. The method of claim 7, further comprising:

communicating with a cloud service to identify a digital certificate associated with a cloud service account;

determining whether the identified digital certificate is present in the storage device; and storing a copy of the identified digital certificate in the storage device when the identified digital certificate is not present in the storage device.

17. A non-transitory computer-readable storage medium containing executable code that when executed by a processing device, causes the processing device to perform operations comprising:

receiving a first request from a client device displaying a graphical user interface to generate a first digital certificate and a first public key;

generating a first certificate signing request based on information received in the first request from the client device;

receiving, over an external network at a server comprising the processing device, the first digital certificate and the first public key from a first third-party certificate authority system; and storing the first digital certificate, the first public key, and an associated first private key in a storage system that is not directly connected to the client device.

18. The computer-readable storage medium of claim 17, wherein the operations further comprise storing, in the storage system, an identifier of a user of the client device that caused the client device to request generation of the stored first digital certificate, an identifier of a developer group associated with the stored first digital certificate, and a text description of the stored first digital certificate.

19. The computer-readable storage medium of claim 17, wherein the operations further comprise deploying, over the external network, the first digital certificate and first public key to a first cloud service account.

20. The computer-readable storage medium of claim 19, wherein the operations further comprise:

receiving a second request from the client device displaying the graphical user interface to generate a second digital certificate;

generating, by a processing device, a second certificate signing request based on information received in the second request from the client device;

receiving, over an external network at a server comprising the processing device, the second digital certificate from a second third-party certificate authority system; and storing the second digital certificate in the storage system.

* * * * *